(12) United States Patent  (10) Patent No.: US 8,649,430 B2
Ikehara et al.  (45) Date of Patent: Feb. 11, 2014

(54) BIT RATE CONVERTER AND BIT RATE CONVERSION METHOD

(75) Inventors: Kiyoshi Ikehara, Musashino (JP); Yoshinori Musha, Sagamihara (JP); Toshimitsu Honkawa, Kokubunji (JP)

(73) Assignee: Hitachi Consumer Electronics Co., Ltd.

( * ) Notice: Subject to any disclaimer, the term of this patent is extended or adjusted under 35 U.S.C. 154(b) by 1012 days.

(21) Appl. No.: 12/477,487

(22) Filed: Jun. 3, 2009

(65) Prior Publication Data

US 2009/0304072 A1    Dec. 10, 2009

(30) Foreign Application Priority Data

Jun. 5, 2008  (JP) .................... 2008-147650

(51) Int. Cl.
 *H04N 7/12*  (2006.01)
(52) U.S. Cl.
 USPC ................. 375/240.02; 375/240.01
(58) Field of Classification Search
 USPC .................................... 375/240.02
 See application file for complete search history.

(56) References Cited

U.S. PATENT DOCUMENTS

| | | | |
|---|---|---|---|
| 5,612,900 A * | 3/1997 | Azadegan et al. | 709/247 |
| 6,738,380 B1 * | 5/2004 | Imai et al. | 370/395.42 |
| 6,987,808 B2 * | 1/2006 | Mine | 375/240.03 |
| 7,221,857 B2 * | 5/2007 | Zimmermann | 386/200 |
| 7,432,832 B2 | 10/2008 | Miyamoto et al. | |
| 2002/0131496 A1 * | 9/2002 | Vasudevan et al. | 375/240.11 |
| 2002/0173954 A1 | 11/2002 | Sakazawa et al. | |
| 2003/0206590 A1 * | 11/2003 | Krishnamachari | 375/240.16 |

FOREIGN PATENT DOCUMENTS

| | | |
|---|---|---|
| JP | 2001-333427 A | 11/2001 |
| JP | 2002-344394 A | 11/2002 |
| JP | 2003-61089 A | 2/2003 |
| JP | 2003-199102 A | 7/2003 |
| JP | 2006-33014 A | 2/2006 |
| JP | 2006-340066 A | 12/2006 |

* cited by examiner

*Primary Examiner* — Christopher S Kelley
*Assistant Examiner* — Maria Vazquez Colon
(74) *Attorney, Agent, or Firm* — Mattingly & Malur, PC

(57) ABSTRACT

A bit rate converter for converting a first encoded animation image data to a second animation image data, having a different bit rate. The converter stores an assessment value indicating the importance level within each reproduction time interval with respect to the first animation image data. Second animation image data is generated by arithmetically determining the bit rate of the second animation image data on the basis of the bit rate information on the first animation image data and the assessment value indicating the importance level within a preselected time interval with respect to the first animation image data. Accordingly, a larger amount of code is preferentially allocated to the time interval having an assessment value of higher importance level.

3 Claims, 14 Drawing Sheets

FIG. 3

| STREAM ID: | PROG0001 |

| LAPSE TIME (millisecond) | ASSESSMENT VALUE |
| --- | --- |
| 0 | 5 |
| 1000 | 7 |
| 2000 | 7 |
| 3000 | 2 |
| 4000 | 4 |
| 5000 | 7 |
| 6000 | 9 |
| ⋮ | |
| 600000 | 0 |

FIG. 4

| STREAM ID | REPRODUCTION TIME | PATH NAME |
|---|---|---|
| PROG0001 | 1:00 | /DTV/PROG/PROG001.MPG |
| PROG0002 | 60:00 | /DTV/PROG/PROG002.MPG |
| PROG0003 | 30:00 | /DTV/PROG/PROG003.MPG |

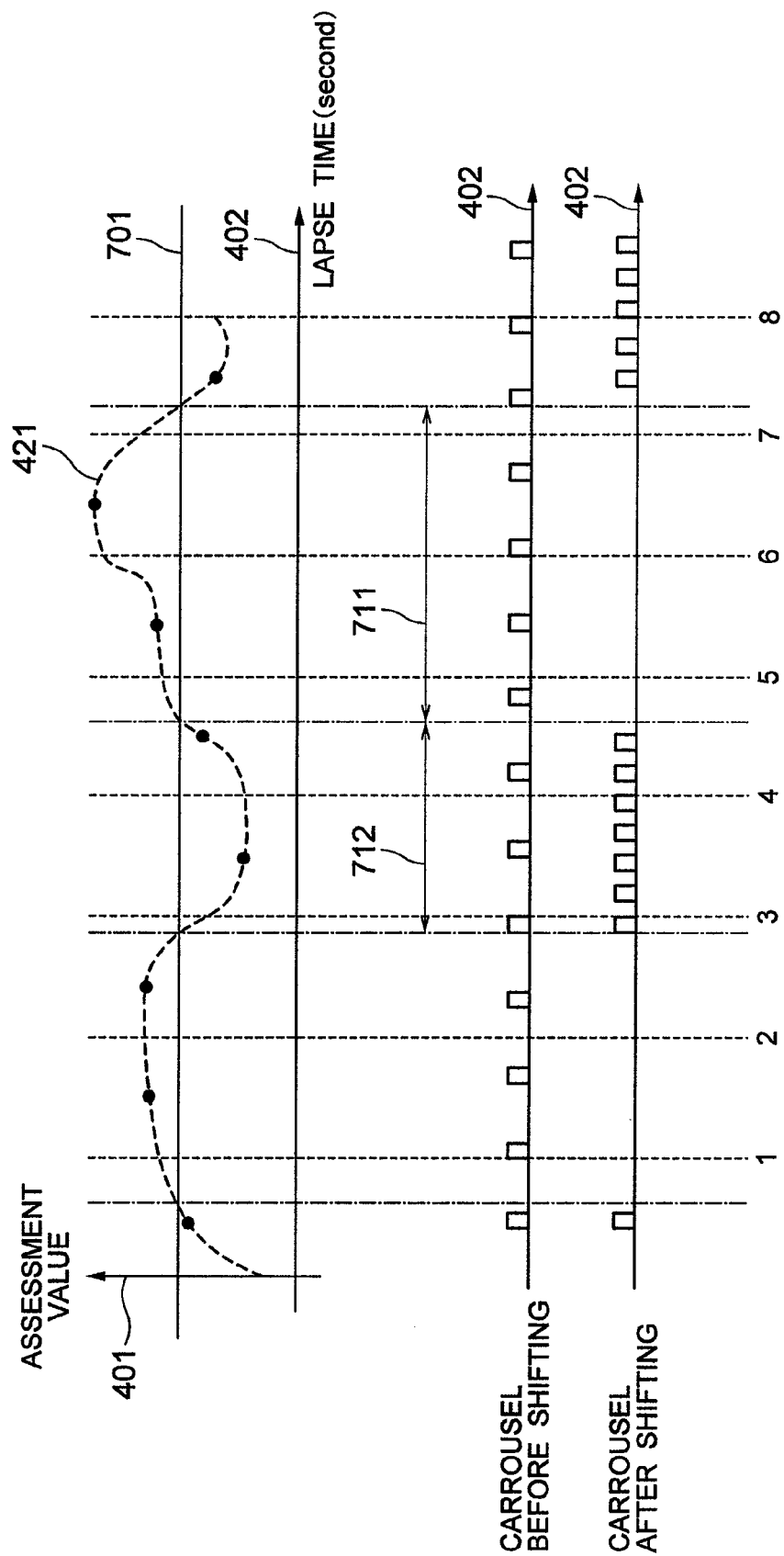

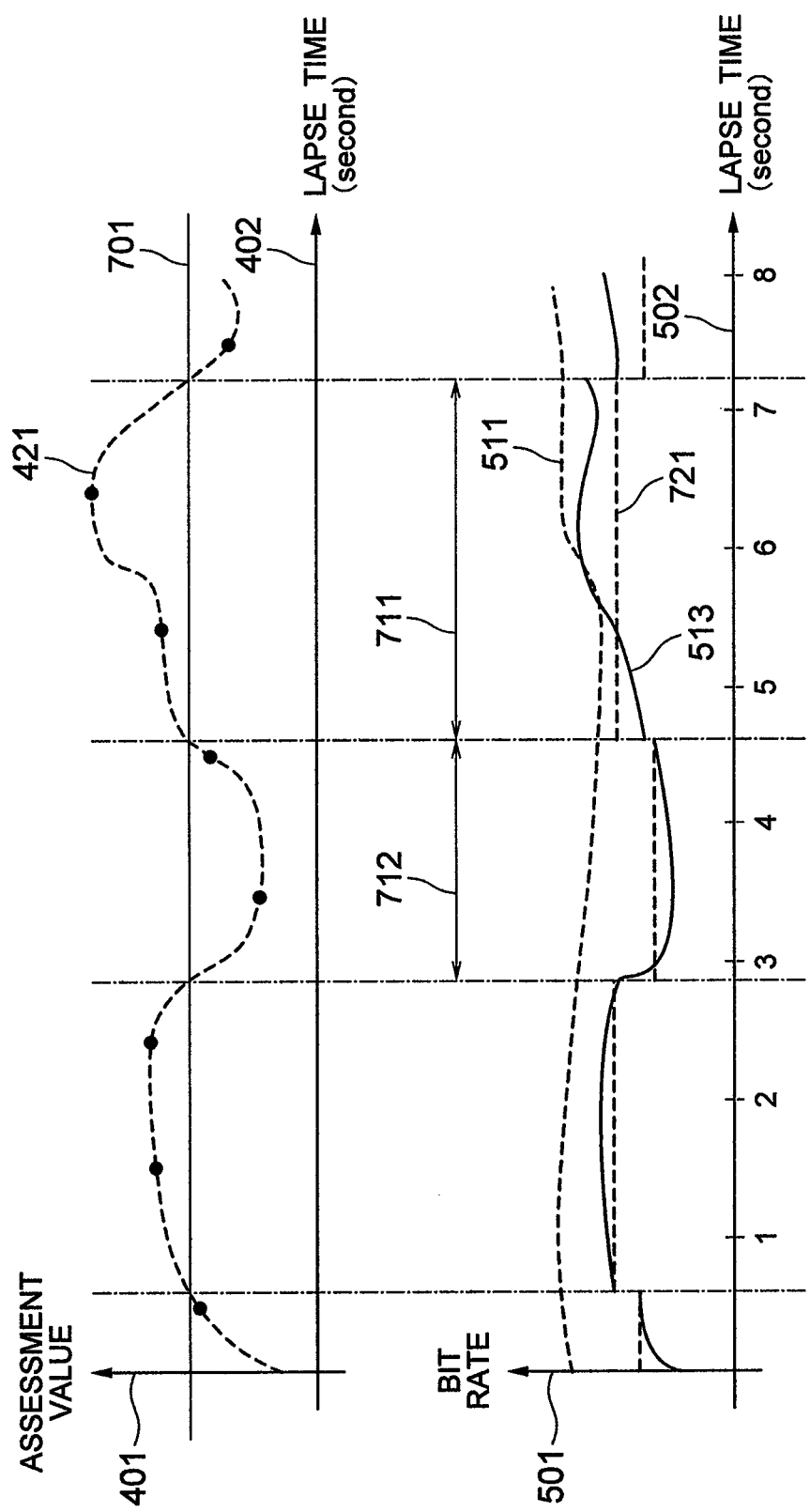

BIT RATE CONVERTER AND BIT RATE CONVERSION METHOD

INCORPORATION BY REFERENCE

The present application claims priority from Japanese application JP2008-147650 filed on Jun. 5, 2008, the content of which is hereby incorporated by reference into this application.

FIELD OF THE INVENTION

This invention relates to a bit rate converter and a bit rate conversion method, and more particularly to a bit rate converter for converting animation image data encoded to be transmitted through a transmission channel to animation image data having a different bit rate.

BACKGROUND OF THE INVENTION

JP-A-2003-61089 discloses a bit rate converter which can determine the picture quality of a desired portion in a video image on the basis of auxiliary information associated with the video image, thereby preventing the deterioration of the picture quality in that portion of the image which the picture producer considers important.

JP-A-2003-199102 discloses a bit rate converter which can improve the discernibility of animation images by detecting an important area in an image and allocating a large amount of code to the important area.

In storing animation images in a storage medium or transmitting them through a network, such an encoding system as MPEG-2 (ISO/IEC 13818) is used in order to reduce data amount while maintaining the quality of animation intact. In general, the amount of code per frame is determined depending on the bit rate that represents data amount per unit time. The bit rates for animation images are determined depending on the capacity of transmission channel for broadcasting. Therefore, when animation image data having been encoded under the condition that they are transmitted over a certain transmission channel, are to be transmitted over another transmission channel having a narrower bandwidth, the original animation image data must be converted to other animation image data having lower bit rates.

However, reducing bit rate may lead to deteriorating picture quality. To prevent this adverse effect, a variety of techniques have been devised which prevent the information that the viewers consider important from disappearing when recorded animation image data are converted to ones having lower bit rates.

The techniques disclosed in JP-A-2003-61089 and JP-A-2003-199102 are kinds of methods that suppress the deterioration of picture quality in a picture area of animation depending on whether the picture area is considered important. These methods may be suitable for the case where information is to be conveyed to viewers by means of images. According to these methods, for each frame of animation, the picture quality in an area containing an important object is prevented from deteriorating by allowing the picture quality in an area not containing an important object to deteriorate. However, what is important for the viewers of animation varies with time. For example, since, in a soccer game, winning the game depends on each team's point score, the scene of goal scoring is one of the most attractive scenes in the soccer game broadcasting program. Accordingly, motion picture frames covering a period of time from a moment just before the goal scoring to a moment just after the goal scoring can be said to be of higher importance than motion picture frames not covering the scene of goal scoring. It is therefore expected that the deterioration of a picture quality of the scene which viewers consider important can be prevented, if it is possible to adjust the amount of code to be allocated to the time intervals along the reproduction time axis depending on the importance of scene.

SUMMARY OF THE INVENTION

A bit rate converter for use in the imaging of animation according to this invention is characterized in that when the bit rate of animation image data is converted, the bit rate of the animation image data to be generated is arithmetically calculated and converted on the basis of the importance associated with each reproduction time interval, the information on the pre-conversion animation image data, and the transmission capacity of transmission channel.

Namely, according to this invention, there is provided a bit rate converter for converting the first encoded animation image data to the second animation image data having a bit rate different from the bit rate of the first animation image data, the bit rate converter including a unit for storing an assessment value indicating the importance level within each reproduction time interval with respect to the first animation image data, wherein the second animation image data are generated by arithmetically determining the bit rate of the second animation image data on the basis of the bit rate information on the first animation image data and the assessment value indicating the importance level within each preselected time interval with respect to the first animation image data, so that the amount of code is preferentially allocated to the preselected time interval having the higher assessment value which corresponds to the higher importance level.

According to this invention, there is provided a bit rate converter wherein the assessment value as mentioned above, indicating the importance level is an assessment value that indicates the importance level within a preselected time interval in the first animation image data, and wherein assessment value interpolation is performed during the time intervals where there are no assessment values indicating importance level.

According to this invention, there is provided a bit rate converter which receives, from the receiver that is the receiving source for the second animation image data, the information on the total capacity of the reception buffer, the extent of the reception buffer being used, and the bit rate as the measure of reception speed, in determining the bit rate of the second animation image data, and which determines within each of the time intervals the bit rate of the second animation image data so that the extent of the reception buffer being used may not exceed the total capacity of the reception buffer during data reception.

According to this invention, there is provided a bit rate converter wherein when the first animation image data include additional data irrelevant to the encoding of animation image, all or part of the additional data are shifted in order from the time intervals having assessment values indicating high importance level to the time intervals having assessment values indicating lower importance level, with respect to the first animation image data, and wherein the bit rate of the second animation image data is determined for each of the time intervals in such a manner that the increase or decrease in the bit amount as a result of the distribution of the additional data into the respective time intervals can be offset.

According to this invention, there is provided a bit rate conversion method for converting the first encoded animation image data to the second animation image data having a bit rate different from the bit rate of the first animation image data, comprising a step of storing an assessment value indicating the importance level of each of the time intervals with respect to the first animation image data, and a step of generating the second animation image data by arithmetically determining the bit rate of the second animation image data on the basis of the bit rate information on the first animation image data, the assessment value indicating the importance level of a preselected time interval with respect to the first animation image data, and the target average bit rate, so that the amount of code becomes larger for the time interval having higher assessment values which correspond to higher importance levels.

According to this invention, there is provided a bit rate conversion method comprising a step of receiving, from the receiver that is the receiving source of the second animation image data, the information on the total capacity of the reception buffer, the extent of the reception buffer being used, and the bit rate as the measure of reception speed, in determining the bit rate of the second animation image data, and a step of determining for each of the respective time intervals the bit rate of the second animation image data so that the extent of the reception buffer being used may not exceed the total capacity of the reception buffer during data reception and that the entire capacity of the reception buffer may not be used up.

According to this invention, at the time of the bit rate conversion of animation image data performed for the purpose of further reducing the amount of encoded animation image data or lowering the bit rate so as to transmit a video signal through a network having a narrow frequency bandwidth, the deterioration of picture quality can be prevented by preferentially allocating larger amount of code to the time interval having an assessment value of higher importance level, and therefore the discernibility of animated picture can be improved with respect to the scenes which viewers consider important.

In the case where the bit rate converter of this invention is connected with an animation receiver via a network so as to distribute animations, the length of time interval subjected to a single process at the time of allocating the amount of code is determined depending on the buffer capacity on the receiving side, and therefore the bit rate converter according to this invention can be applied to animation receivers having a wide variety of reception buffer capacities and also the conversion of bit rate can be properly performed even in the case where the reception buffer capacity fluctuates.

Further, with the bit rate converter according to this invention, in the case where such additional data as data carousels defined in MPEG 2 (ISO13813-6) are included in the pre-conversion animation image data, re-multiplexing is performed in such a manner that the additional data are reallocated to time intervals of low importance level, and therefore the discernibility of animation scenes which viewers consider important can be further improved.

Other objects, features and advantages of the invention will become apparent from the following description of the embodiments of the invention taken in conjunction with the accompanying drawings.

BRIEF DESCRIPTION OF THE DRAWINGS

FIG. 3 illustrates a stream information table used in the first embodiment of this invention;
FIG. 4 illustrates an assessment value table used in the first embodiment of this invention;
FIG. 13 shows the process of adjusting multiplex positions, performed in the third embodiment of this invention;
and
FIG. 14 shows in graphical representations the bit rate calculation process performed in the third embodiment of this invention.

DETAILED DESCRIPTION OF THE EMBODIMENTS

The best modes of this invention will be described below in reference to the attached drawings. The bit rate converter and the bit rate conversion method according to this invention will be described below by way of embodiments with the aid of the attached drawings.

Embodiment 1

Figure 1:
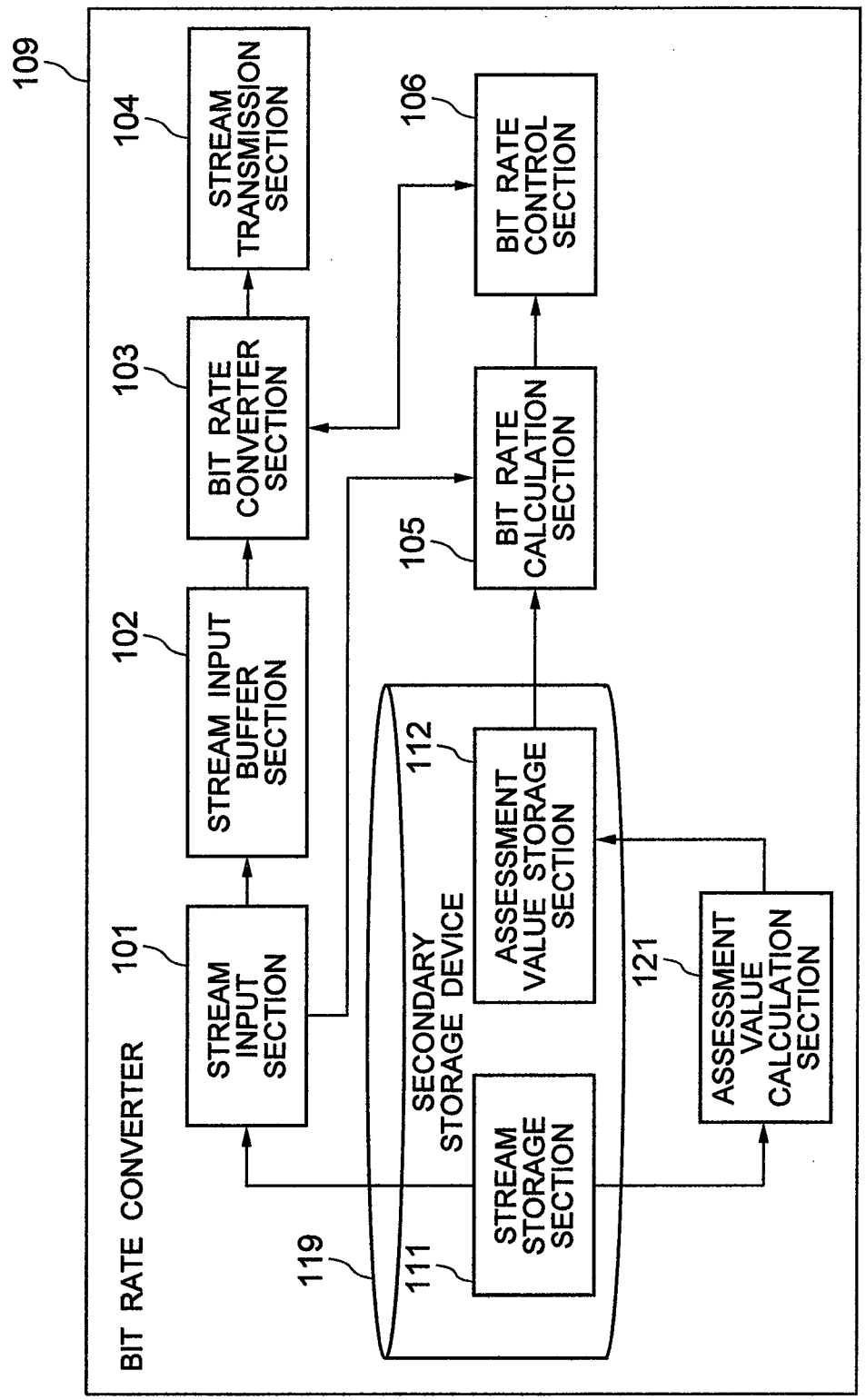
FIG. 1 shows in block diagram the overall configuration of a bit rate converter as a first embodiment of this invention.

FIG. 1 shows in block diagram the system configuration of a bit rate converter as a first embodiment of this invention. In FIG. 1, a stream input section 101, a stream input buffer section 102, a bit rate conversion section 103, a stream transmission section 104, a bit rate calculation section 105, a bit rate control section 106, and an assessment value calculation section 121 are shown as independent, discrete blocks. However, if they are desired to be collectively represented as software, they may be in the form of a single program. And such a program may be stored in a storing medium.

In the following, the details of the respective blocks constituting the bit rate converter 109 will be described. The stream input section 101 reads an animation image stream out of the stream storage section 111 and loads the read stream into the stream input buffer section 102. The bit rate conversion section 103 receives animation image data from the stream input buffer section 102 and a bit rate from the bit rate control section 106 and converts the received bit rate to a specified bit rate, then delivers the specified bit rate to the stream transmission section 104.

The stream transmission section 104 sends the stream of the animation image data, which are inputted from the bit rate conversion section 103, out to the external of the bit rate converter 109 by using any type of communication means. Alternatively, the stream transmission section 104 may be configured to store the stream of the animation image data inputted from the bit rate conversion section 103 in the stream storage section 111, not output the stream of the animation image data out to the external of the bit rate converter 109.

Figure 3:
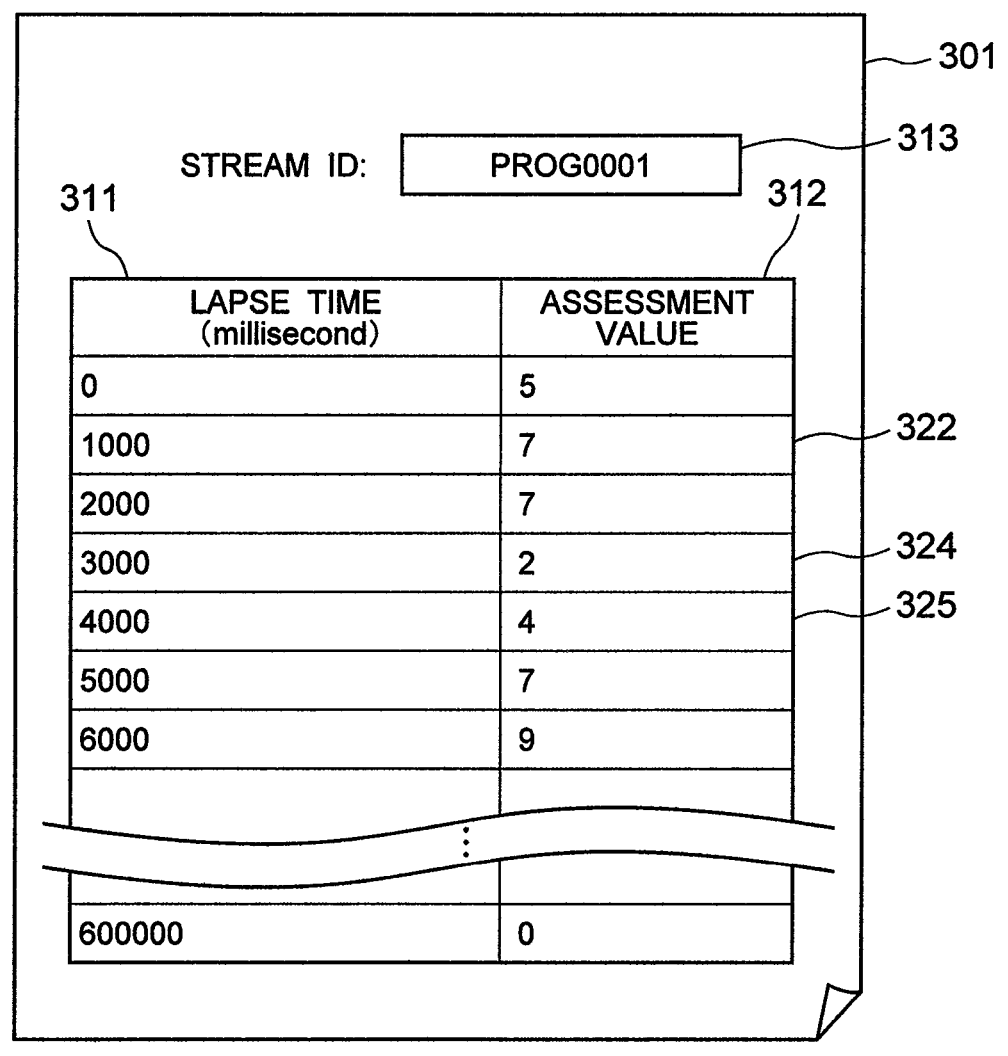

The assessment value calculation section 121 reads an animation image stream out of the stream storage section 111; analyzes such meta-information as genre information, animation image data and voice data contained in the animation image stream; calculates an assessment value indicating the importance level of each frame; and loads the calculated assessment value in the assessment value storage section 112. The procedure, for example, for assessing the importance levels of frames in the digest video generation technique may be used for serving as the assessment value calculation section 121. In the field of the digest video generation technique where a new series of animation images, which are summarized from the original series of the animation images, are generated by extracting such frames as considered to include important scenes, some techniques calculate values for numerically indicating the degree of what viewers assess as important with respect to each frame. For example, as shown in FIG. 3, scores (assessment values) are calculated for respective reproduction (or lapse) time intervals.

The bit rate calculation section 105 reads out an assessment value indicating importance level from the assessment value storage section 112. Then, on the basis of the reproduction time interval during which bit rate conversion is performed, the assistant value indicating the importance level at an reproduction time point within the reproduction time interval and the bit rate of the input animation image data within the reproduction time interval, the bit rate calculation section 105 calculates the bit rate of animation image data to be outputted during the reproduction time interval so that the bit rate of the animation image stream to be outputted to the bit rate control section 106 is determined. On the basis of the target values of bit rate at respective reproduction time points, the bit rate control section 106 outputs bit rate values to the bit rate conversion section 103.

Figure 2:
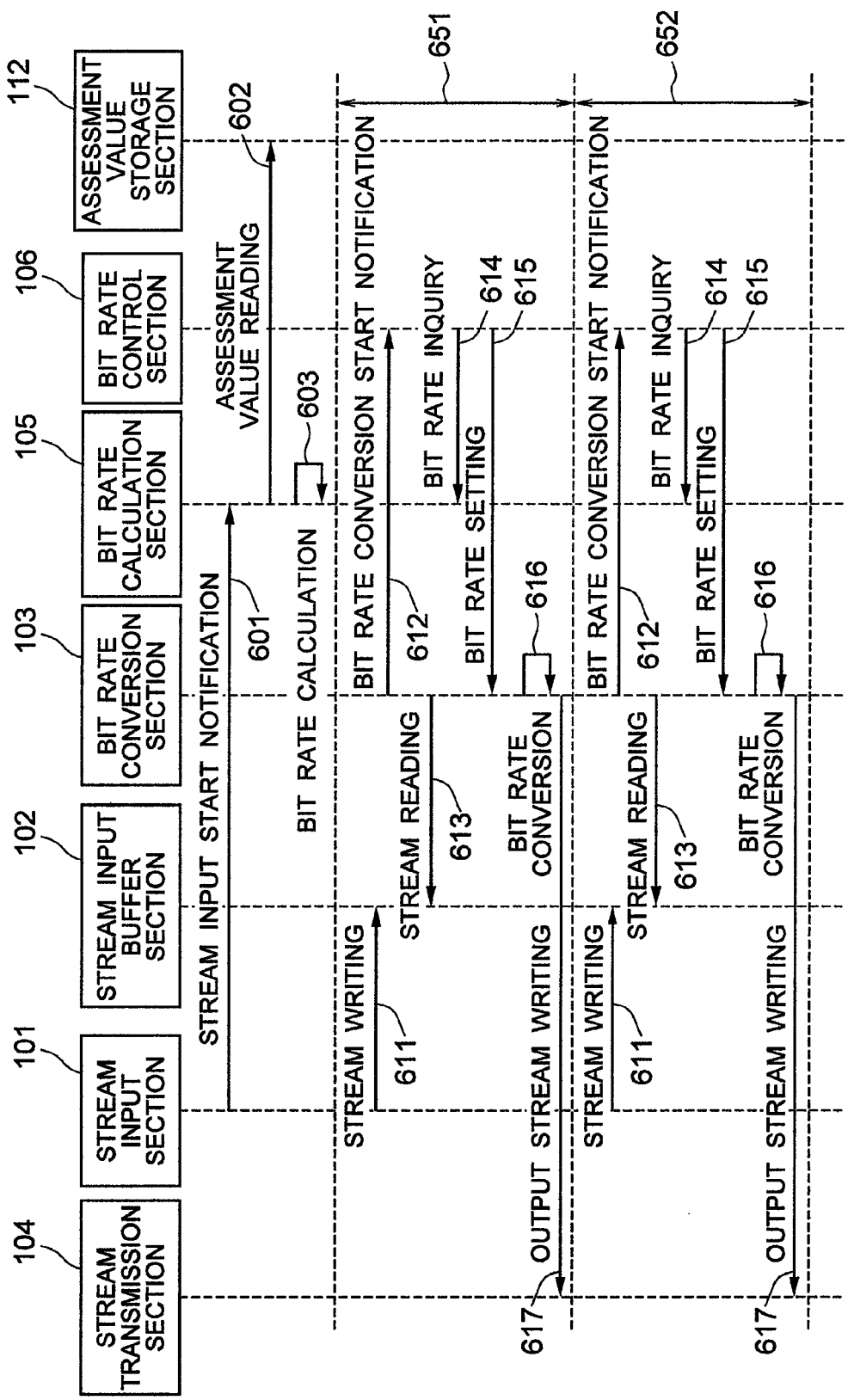
FIG. 2 shows a process sequence according to the first embodiment of this invention.

A process sequence according to the first embodiment of this invention will now be described in reference to FIG. 2. In FIG. 2, only the sequence of bit rate conversion is described and the process of calculating the assessment value by the assessment value calculation section 121 is omitted. When the process of bit rate conversion is instructed to start, the stream input section 101 transmits a stream input start notification (message 601) along with the stream ID of the input stream, to the bit rate calculation section 105. Then, the bit rate calculation section 105 inquires the assessment value storage section 112 about the assessment value of interest (message 602). Next, the bit rate calculation section 105 calculates the bit rate corresponding to the assessment value (message 603). As the stream input section 101 writes a part of the stream in the stream input buffer section 102 (message 611), the bit rate conversion section 103 transmits the bit rate conversion start notification along with the reproduction time interval for the stream to be read out, to the bit rate control section 106 (message 612). Thereafter, the bit rate conversion section 103 reads a stream out of the stream input buffer section 102 (message 613). The bit rate control section 106 inquires the bit rate conversion section 105 about the bid rate for the interval of interest (message 614) and then sets a proper bit rate in the bit rate conversion section 103 (message 615). The bit rate conversion section 103 performs the bit rate conversion process in accordance with the set bit rate (message 616). Thereafter, the bit rate conversion section 103 writes the stream whose bit rate has been converted, in the stream transmission section 104 (message 617). Hereafter, until all the input streams has been subjected to bit rate conversion, such a set of processes 611 through 617 as contained in a region 651 will be repeated. Thus, a set of processes 611 through 617 contained in a region 652 are the first repetition.

Description is now made of the stream management table associated with the information stored in the stream storage section 111, in reference to FIG. 4. The stream management table consists of a column 701 indicating the IDs of streams, a column 702 indicating reproduction times and a column 703 indicating the positions in the stream storage section 111 where substantial streams are stored.

Then, description is made of assessment values calculated by the assessment value calculation section 121, in reference to FIG. 3. The calculated assessment values are stored in the form of a table 301 as illustrated in FIG. 3. In FIG. 3, the item 313 indicating a stream ID is an identifier that indicates which animation image stream has generated the content of the table 301. Each of the values shown in the column 311 indicating a starting time denotes the starting point of the time interval during which assessment has been performed. Each of the values shown in the column 312 indicating assessment values denotes an assessment value within that time interval. For example, the assessment value for the time interval from the starting time listed in the row 324 to the starting time listed in the row 325 is meant to be "2" which value is located in column 312 and row 324.

Figure 5:
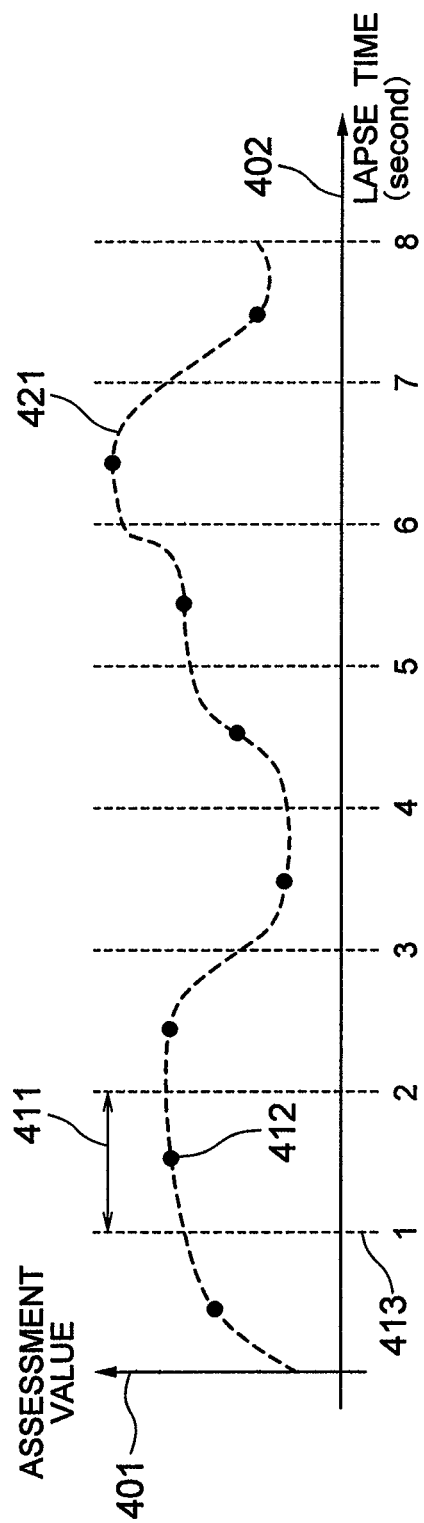
FIG. 5 shows how to calculate bit rates for respective time intervals in the first embodiment of this invention.
Figure 6:
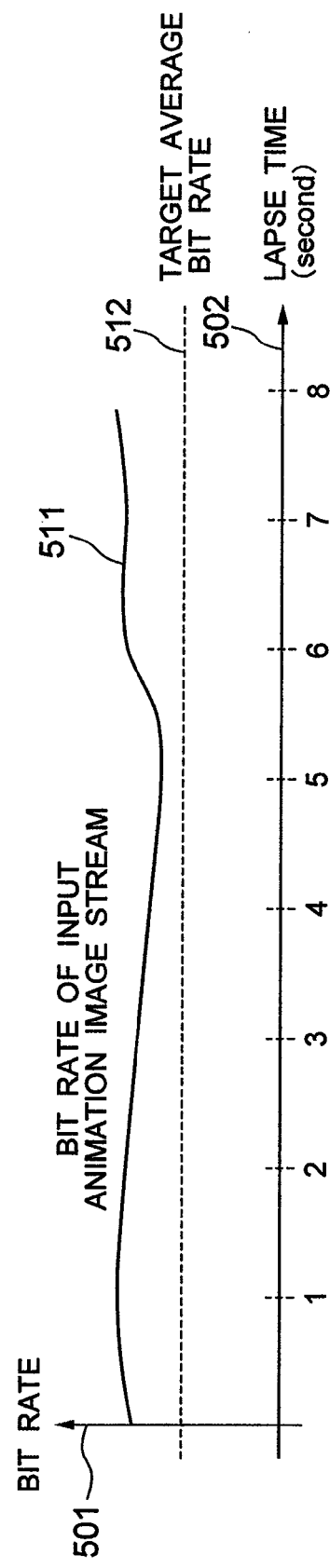
FIG. 6 illustrates the change in the bit rate in the input animation image stream in the first embodiment of this invention.
Figure 7:
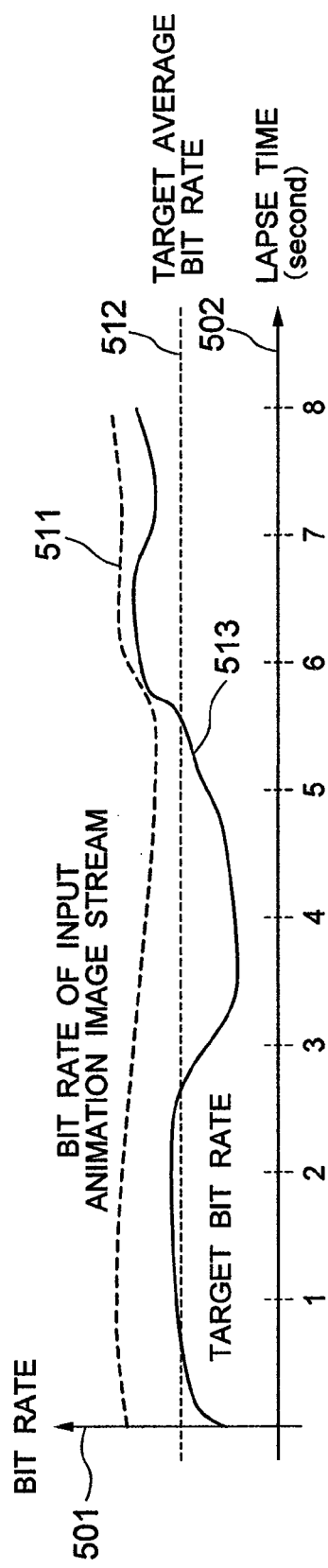
FIG. 7 illustrates the target bit rate for the output stream in the first embodiment of this invention.

The bit rate calculation process performed by the bit rate calculation section 105 will be described in reference to FIG. 5 showing how to calculate bit rates for respective time intervals, FIG. 6 illustrating the change in the bit rate in the input stream, and FIG. 7 illustrating the target bit rate for the output stream.

The bit rate calculation section 105 extracts the stream ID of the stream read out of the stream storage section 111 by the stream input section 101, and reads, using the stream ID as a key, the corresponding table of assessment values out of the assessment value storage section 112. The value in the read assessment value table is regarded as the representative value within the time interval of interest, and plotted in the center of the time interval. In FIG. 5, for example, the assessment value for the interval 411 can be obtained from row 322 and column 312 in FIG. 3 and this value is plotted as the point 412. An interpolation process is performed on such plotted points so that the assessment value function S"(t) of time is obtained. As shown in FIG. 5, the function represented by graph 421 can be obtained as a result of such an interpolation process. Various methods such as linear interpolation, splined interpolation, etc. can be used for interpolation purpose.

The variation with time, or temporal variation, of the bit rate can be determined by multiplying the bit rate of the input stream and the assessment value. For example, by using the function $R''_v(t)$ for the input stream having n as its stream ID, the functional values varying with time are calculated in accordance with expression (1) given below.

$$R_v^n(t) = \max(R_{input}^n(t) - C_1, 0) S^n(t) + C_2 \quad (1)$$

In the above expression (1), t indicates the reproduction time in second, $R''_{input}(t)$ the function representing the bit rate change with time in the input stream having n as its stream ID, and $C_1$ and $C_2$ the preselected constants which may be determined depending on, for example, the target average bit rate.

The target bit rate $R''_{output}(t)$ for the output stream corresponding to the input stream having n as its stream ID can be given by the expression (2) below, by normalizing the calculated value of the temporally changing function and multiplying the normalized value by the preset target average bit rate $R_{target}$ (indicated at numeral 512 in FIG. 7).

$$R^n_{output}(t) = \frac{R^n_v(t)}{\int_{T_m}^{T_{m+1}} R^n_v(t)\,dt} \cdot R_{target} \quad (2)$$

$$(T_m \le t < T_{m+1})$$

In the above expression (2), $T_m$ denotes a progression representing the time points along the input stream. For example, in the case where the amount of code is determined and allocated every ten seconds, $T_m=10 \times m$ (seconds). $R_{target}$ is the constant representing the target average bit rate.

Embodiment 2

Figure 8:
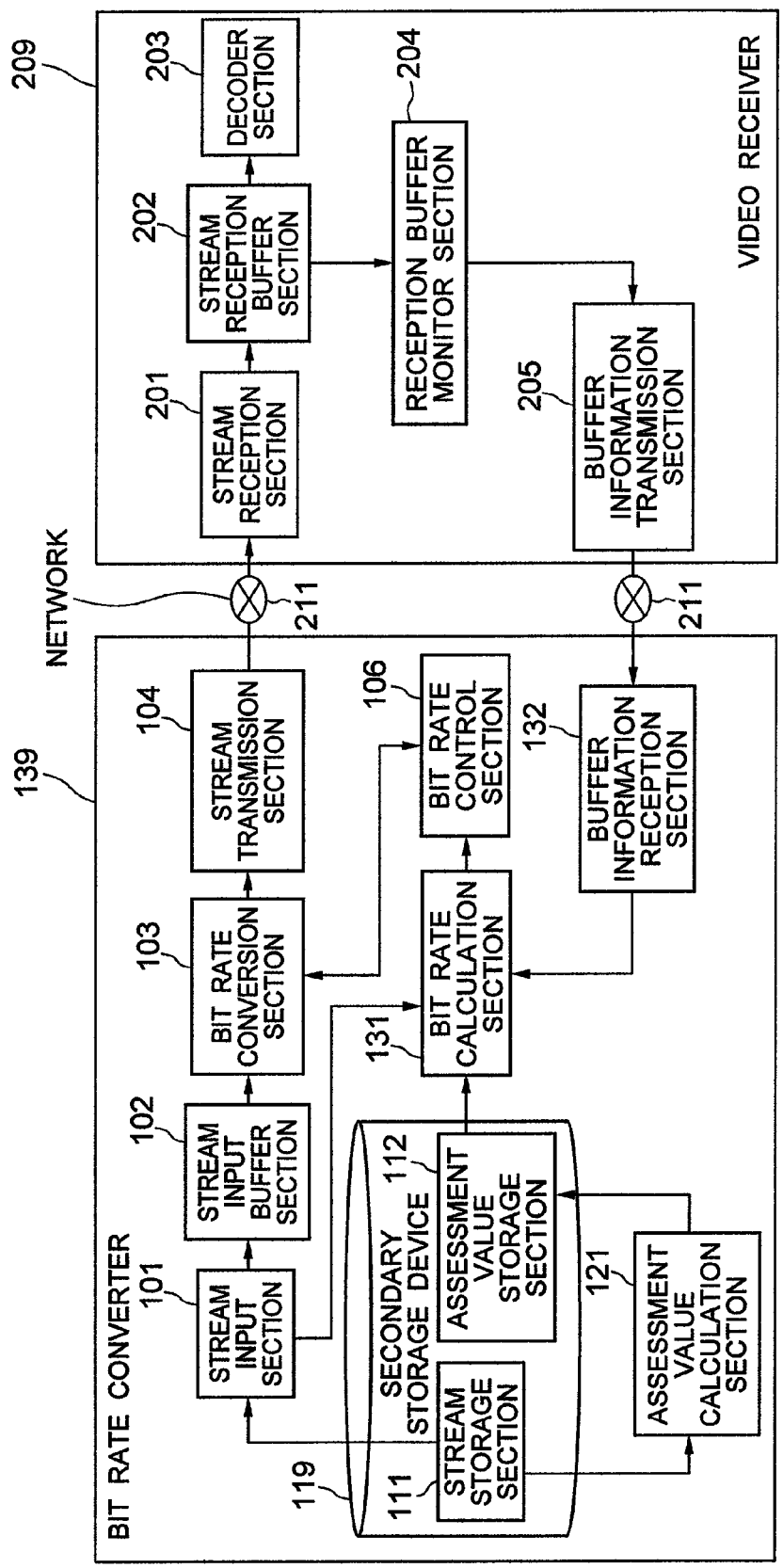
FIG. 8 shows in block diagram the overall configuration of a bit rate converter as a second embodiment of this invention.

Now, a second employment of this invention will be described. FIG. 8 shows in block diagram the system configuration of a bit rate converter as a second embodiment of this invention. The respective blocks constituting the bit rate converter 139 shown in FIG. 8 are basically the same as those which constitute the bit rate converter 109 shown as the first embodiment of this invention in FIG. 1, but the bit rate converter 139 differs from the bit rate converter 109 in that it is further provided with a buffer information reception section 132 for receiving the information on stream reception buffer from a video receiver 209 and a bit rate calculation section 131 for calculating the values of bit rates depending on the received information.

The flow of data through those blocks included in the bit rate converter 139 and the video receiver 209 will be described below. A stream reception section 201 in the video receiver 209 receives a video stream transmitted via a network 211 from the stream transmission section 104 in the bit rate converter 139, and delivers the received video stream to a stream reception buffer section 202. A variety of networks, whether wired or wireless, may be used as the network 211. The stream reception buffer section 202 is a block for temporarily holding the video streaming and therefore composed of storage devices such as memories. A decoder section 203 reads a video stream out of the stream reception buffer section 202 and decodes the encoded information contained in the video stream. A reception buffer monitor section 204 monitors the stream reception buffer section 202; obtains reception buffer information consisting of the total capacity of the reception buffer, the currently occupied capacity of the reception buffer and the received bit rate; and delivers the obtained information to a buffer information transmission section 205. The buffer information transmission section 205 transmits the reception buffer information via a network 211 to the buffer information reception section 132. The buffer information reception section 132 delivers the reception buffer information to the bit rate calculation section 131.

The bit rate calculation section 131 reads an assessment value representing importance level out of the assessment value storage section 112. Further, on the basis of the reproduction time interval during which bit conversion is performed, the assessment value of importance level at each time point within the reproduction time interval, the bit rate of the input animation image data within the reproduction time interval, the total capacity of the buffer, and the occupied capacity of the buffer, the bit rate calculation section 131 calculates the bit rate of the output animation image data within the reproduction time interval, and determines the bit rate of the animation image stream to be outputted to the bit rate control section 106.

Figure 9:
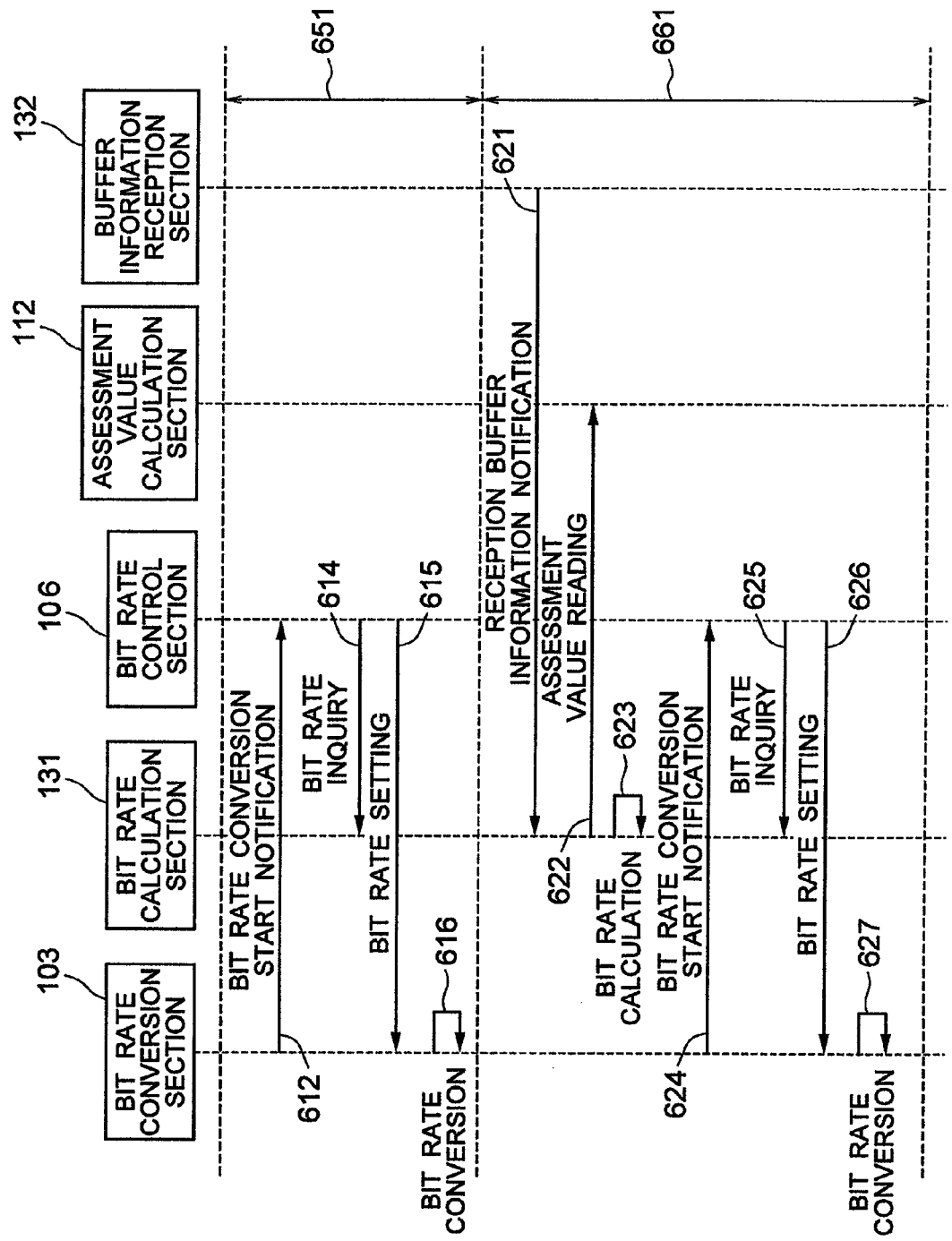
FIG. 9 shows a process sequence according to the second embodiment of this invention.

An example of the process performed by the bit rate calculation section 131 will be described in reference to FIG. 9 which illustrates the flow of bit rate calculation process. The bit rate calculation section 131 performs bit rate calculation in the case (1) where the bit rate for a reproduction time interval during which the bit rate conversion section 103 performs its operation, has not yet been calculated and (2) where the information on the reception buffer has been inputted from the buffer information reception section 132. In FIG. 9, the process sequence is shown corresponding to the case (2) where the information on the reception buffer has been inputted from the buffer information reception section 132. The processes within the region 651 in the FIG. 9 are the same as those processes shown as associated with the first embodiment in FIG. 2. The buffer information reception section 132 delivers, at any timing, a reception buffer information notification to the bit rate calculation section 131. For example, let it be assumed that the buffer information reception section 132 delivers the reception buffer information notification to the bit rate calculation section 131 at the beginning of the region 661 (massage 621). Then, the bit rate calculation section 131 reads an assessment value out of the assessment value storage section 112 (message 622) and calculates the corresponding bit rate (message 623). As the bit rate conversion section 103 sends out a bit rate conversion start notification to the bit rate control section (message 624), the latter inquires the bit rate calculation section 131 about the bit rate for the time interval during which bit rate conversion takes place (message 625). At this time, a value is obtained as a result of the above mentioned bit rate calculation process (message 623) and the obtained value is set into the bit rate conversion section 103 (message 626). Thus, the bit rate conversion section 103 performs bit rate conversion process depending on the recalculated bit rate (message 627).

Figure 10:
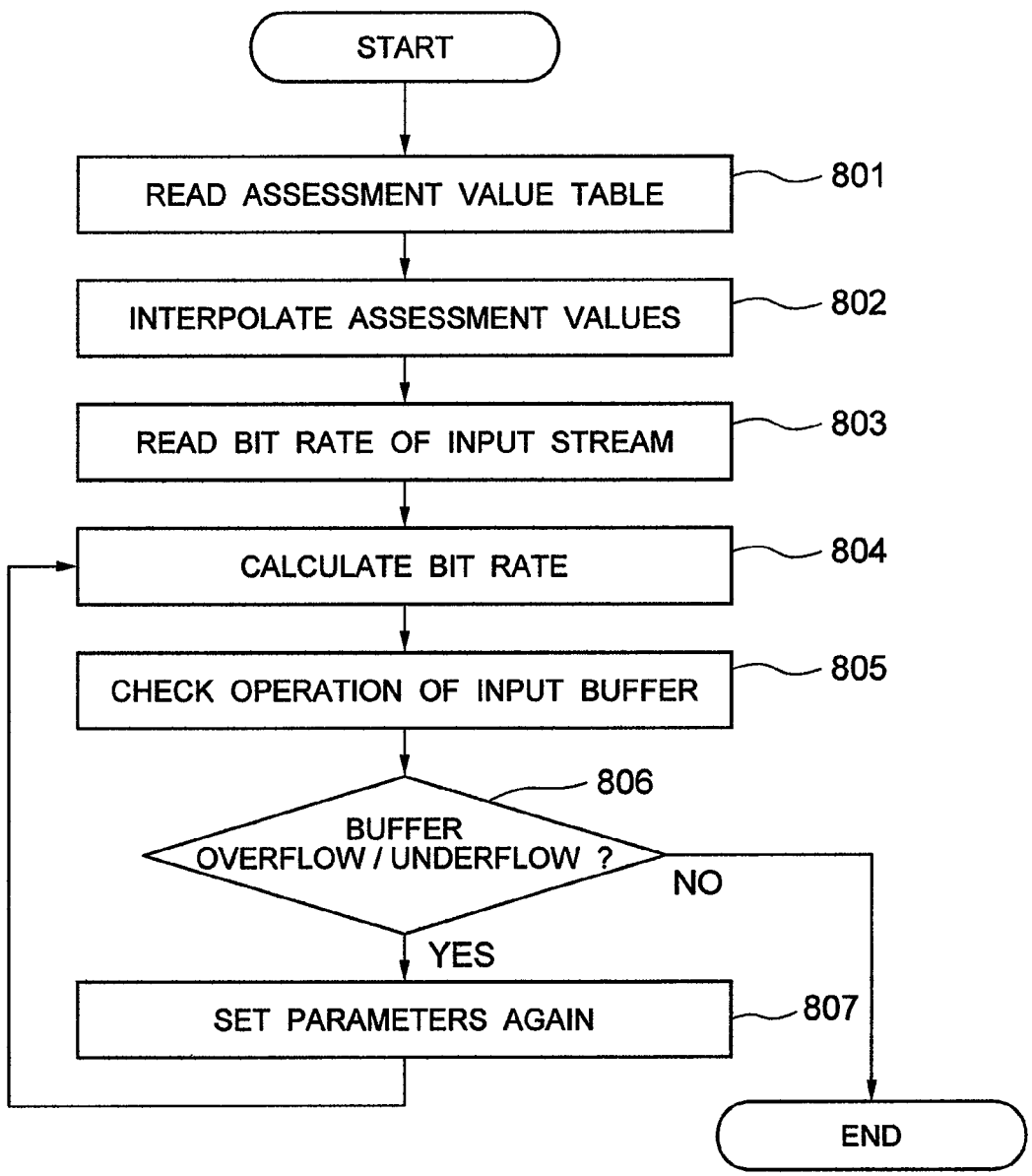
FIG. 10 illustrates the flow of bit rate calculation process in the second embodiment of this invention.

Now, description is made of how a bit rate at a time point is calculated in reference to FIG. 10 which illustrates the flow of bit rate calculation process. The bit rate calculation section 131 extracts the stream ID of the stream read out by the stream input section 101 and reads the assessment value table corresponding to the extracted stream ID out of of the assessment value storage section 112 (step 801). Then, the interpolation of assessment values is performed in accordance with the same procedure as used in the first embodiment of this invention (step 802). Next, the bit rate information on the stream corresponding to the stream ID is read out (step 803), the bit rate is calculated (step 804), the process of checking the operation of the input buffer is performed (step 805), and a judgment process is performed on the basis of the result of the checking process (step 806). If judgment is that there's no overflow or underflow in the input buffer, the calculated bit rate is regarded as the final result and the process control flows to END. If otherwise, the process control flows to Step 807. In Step 807, parameters are set again so that the target bit rates can be smoothed, and then control flows to Step 804.

Description will now be made of the process of calculating bit rates in Step 804. The temporal variation of bit rate is determined by multiplying the bit rate of an input stream by an assessment value. For example, by using the function $R^n_v(t)$ for the input stream having n as its stream ID, the functional values for varying times are calculated in accordance with exposition (3) given below.

$$R^n_v(t) = \max(R^n_{input}(t) - C_1, 0) \cdot S^n(t) + C_2 \quad (3)$$

In the above expression (3), t indicates the time of reproduction, $R^n_{input}(t)$ the function representing the bit rate change with time lapse in the input stream having n as its stream ID, and $C_1$ and $C_2$ the preselected constants which may be determined depending on, for example, the target average bit rate.

The target bit rate $r^n_{output}(t)$ for the output stream corresponding to the input stream having n as its stream ID can be given by the expression (4) below, by normalizing the calculated value of the temporally changing function and multiplying the normalized value by the preset target average bit rate.

$$r^n_{output}(t) = \frac{R^n_v(t)}{\int_{t_c}^{t_c+T_w} R^n_v(t)\,dt} \cdot r_{target} \quad (4)$$

$$(t_c \le t < t_c + T_w)$$

In the above expression, $T_w$ denotes a preset constant representing the length of the time interval during which the amount of code is allocated; $t_c$ the time point at the beginning of the time interval during which bit rate conversion is performed; and $r_{target}$ a constant representing the target average bit rate, obtained from the buffer information reception section 132. The value of this function is meaningful only within the time interval $t_c \le t < t_c + T_w$, and whenever a value outside this interval is required, it is necessary to make calculation specifically for such a required interval.

Figure 11:
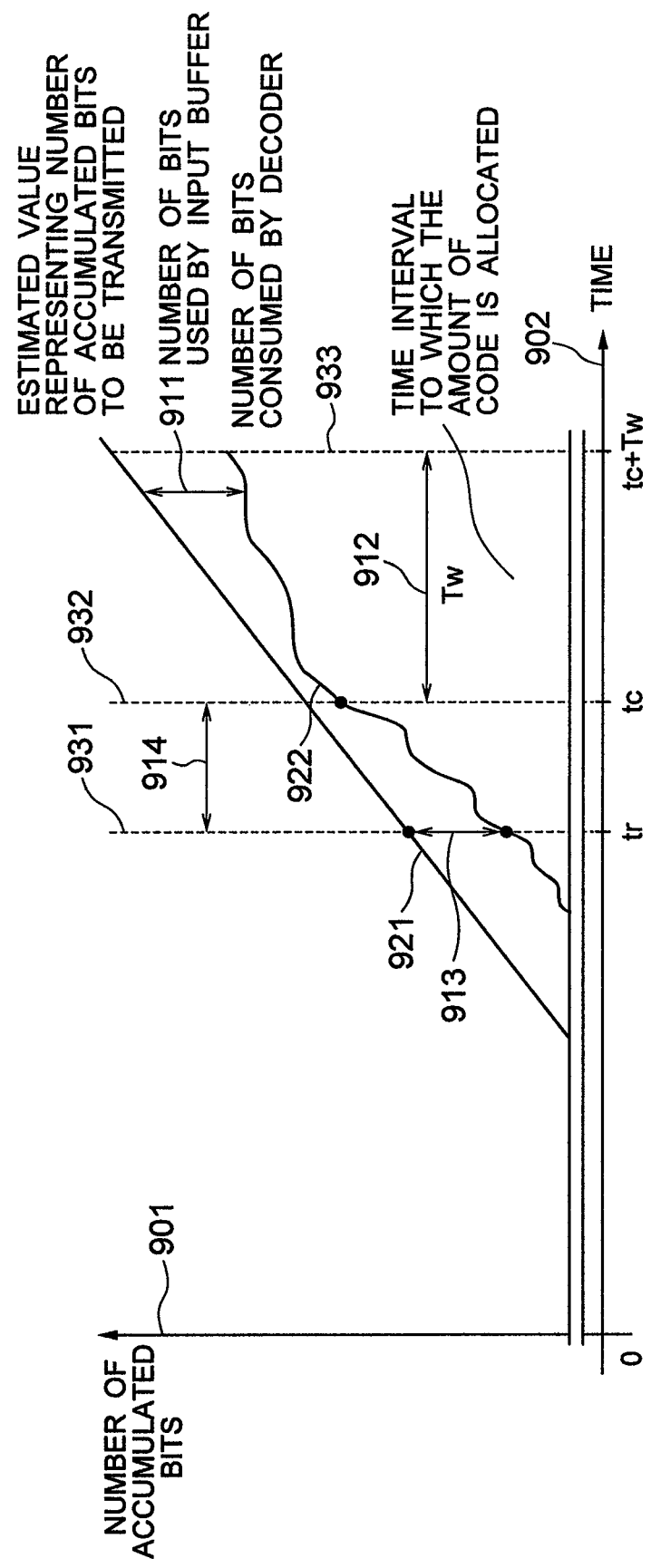
FIG. 11 graphically illustrates the process of checking the operation of the input buffer in the second embodiment of this invention.

The process of checking the reception buffer operation (step 805) will now be described in reference to FIG. 11. In FIG. 11, the vertical axis 901 represents the number of accumulated bits inputted into the reception buffer; the horizontal axis 902 the time lapse; graph 921 the estimated value representing the number of accumulated bits to be transmitted; graph 922 the number of bits consumed by the decoder section 203; bit number 911 the number of bits used by the input buffer for a time point; time interval 912 the reproduction time interval to which the amount of code is allocated; time point 931 the instant for time stamp included in the buffer information; time point 932 the beginning of the time interval to which the amount of code is allocated; time point 933 the end of the time interval to which the amount of code is allocated; bit number 913 the number of bits included in the buffer information and used by the input buffer; and time interval 914 the interval of time during which bit rate conversion has been done.

In the process of checking the operation of the input buffer, the result of integration of the function $r^n_{output}(t)$ over the time interval $t_c \le t < t_c + T_w$ performed in step 804 is plotted. Accordingly, it is checked during the time interval 912 whether the condition is always satisfied that the number of bits used by the input buffer (e.g. bit number 911), equal to the estimated value given by the graph 921 minus the accumulated bits given by the graph 922, does not exceed the total buffer capacity included in the buffer information and is equal to or greater than zero (0). If there's a time interval during which the bit number 911 exceeds the total buffer capacity, overflow is notified. On the other hand, if there's a time during which the bit number 911 falls below zero, underflow is notified. When overflow/underflow is notified, the coefficients are set again in Step 807, so as to smoothed the function $r^n_{output}(t)$. For example, the magnitude of the constant $C_2$ is increased.

Embodiment 3

Figure 12:
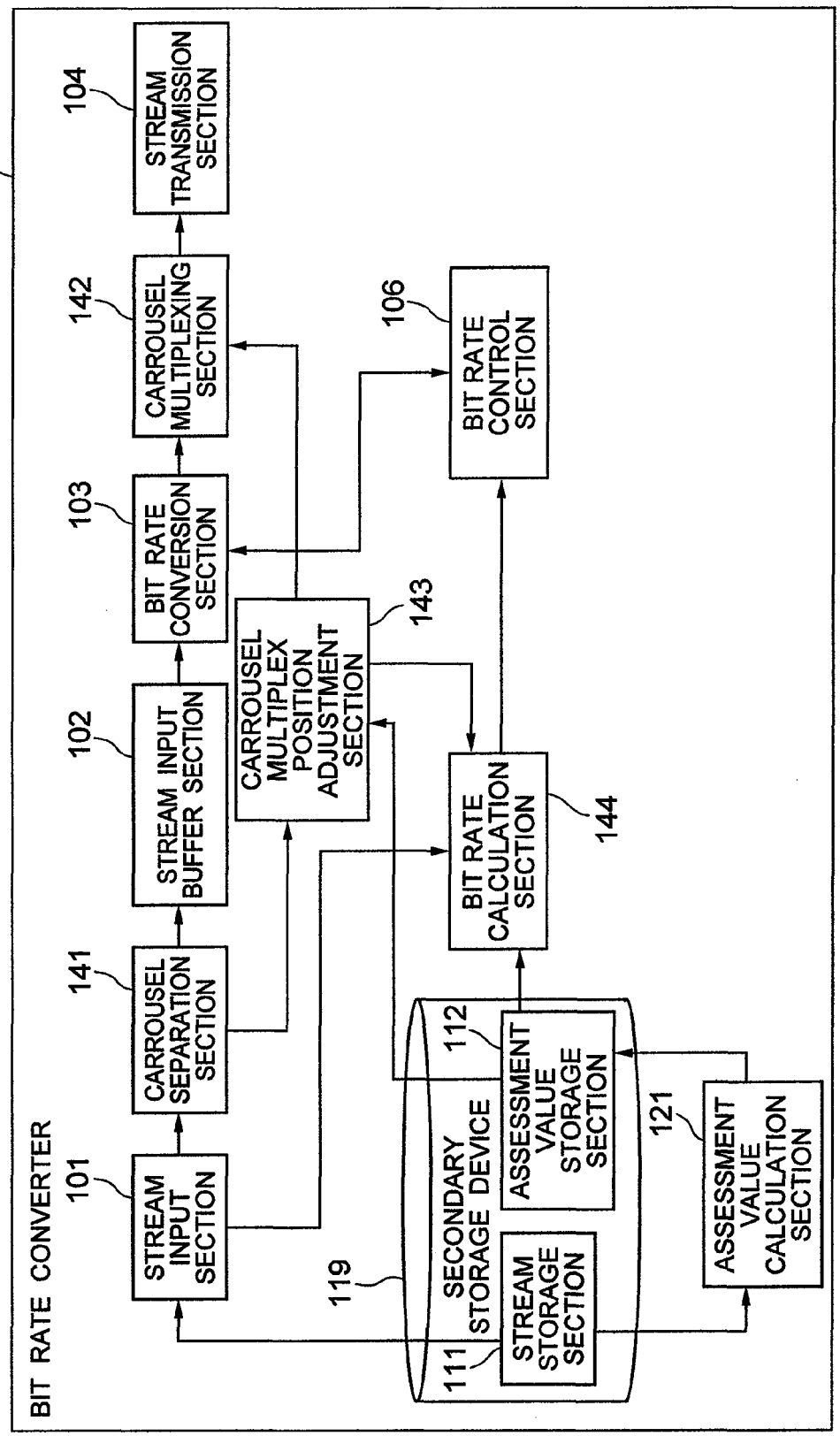
FIG. 12 shows in block diagram the overall configuration of a bit rate converter as a third embodiment of this invention.

A third embodiment of this invention will now be described. FIG. 12 shows in block diagram the system configuration of a bit rate converter as the third embodiment of this invention. The bit rate converter 149 shown in FIG. 12 is basically the same as the bit rate converter 109 shown as the first embodiment of this invention in FIG. 1. The bit rate converter 149 differs from the bit rate converter 109 only in the provision of a carousel separation section 141 for separating the carousel, which is data (data broadcasting etc.) included periodically in a video stream, from the video stream; a carousel multiplexing section 142 for multiplexing the carousel and the video stream and forming a single stream; and a carousel multiplex position adjustment section 143 for adjusting the multiplex positions of the carousels.

The flow of data through those blocks included in the bit rate converter 149 according to this third embodiment will be described below. The stream input section 101 reads a stream out of the stream storage section 111 and delivers the read stream to the carousel separation section 141. The carousel separation section 141 splits the inputted stream into carousels and animation image data, and loads the carousels into the carousel multiplex position adjustment section 143 and the rest of stream into the stream input buffer section 102. The carousel multiplex position adjustments section 143 reads assessment values, which represent importance level, out of the assessment value storage section 112; determines the new multiplex positions of the carousels on the basis of the original multiplex positions of the carousels and the assessment values representing importance level; and outputs the newly determined multiplex positions of carousels to the carousel multiplexing section 142 and also outputs the information on the shifted carousels, that is, the new positions of carousels to the bit rate calculation section 144. The bit rate conversion section 103 receivers animation image data from the stream input buffer section 102 and bit rates from the bit rate control section 106; converts the received bit rates to the specified bit rates; and delivers the specified bit rates to the carousel multiplexing section 142. The carousel multiplexing section 142 multiplexes the animation image data inputted from the bit rate conversion section 103 and the carousels inputted from the carousel multiplex position adjustment section 143, so as to arrange them in the multiplex positions of carousels to be assumed after adjustment, and delivers the multiplexed results to the stream transmission section 104. The bit rate calculation section 144 reads assessment values representing importance level from the assessment value storage section 112; calculates—on the basis of reproduction time intervals during which bit conversion is performed, the assessment values representing importance level at the reproduction time points in the respective reproduction time intervals, the bit rates of the input animation image data in the respective reproduction time intervals and the multiplexed results inputted from the carousel multiplex position adjustment section 143—the bit rates of the output animation image data in the respective reproduction time intervals; and determines the bit rate of the output animation image data supplied to the bit rate control section 106. The rest of the data flow is the same as the data flow described in the first embodiment of this invention.

FIG. 13 illustrates the process of adjusting the multiplex positions of carousels, performed by the carousel multiplex position adjustment section 143 so as to determine the new multiplex positions of carousels. The broken curve 421 in FIG. 13 is similar to the broken curve shown in FIG. 5. In FIG. 13, the threshold value 701 corresponds to the assessment value preselected to determine important time intervals; the time interval 711 is where the assessment value becomes equal to or greater than the threshold value 701; and the time interval 712 is where the assessment value becomes less than the threshold value 701. In the process of adjusting multiplexed positions, the time interval where the assessment value exceeds the threshold value is considered an important time interval, and all or part (a constant proportion) of carousels contained in such an important time interval are shifted to a non-important time interval, with the order of the multiplex positions of carousels in the important time interval kept unaltered. For example, if it is desired to shift carousels contained in an important time interval to an immediately preceding non-important time interval, all the carousels contained in both the time intervals 711 and 712 are evenly distributed in the time interval 712. Accordingly, with respect to the time interval where the new positions of shifted carousels are fixed (e.g. time interval 712), the carousel shift information pairing up the time interval (e.g. time interval 712) with the change in the data amount of carousels (data amount after shift minus data amount before shift) is outputted to the bit rate calculation section 144.

The bit rate calculation process performed by the bit rate calculation section 144, for obtaining a target bit rate will be described in reference to FIG. 14. The bit rate calculation process according to this embodiment is the same as that according to the first embodiment of this invention, except for the interval where bit rates are calculated at a time on the basis of the carousel shift information inputted from the carousel multiplex position adjustment section 143 and except that the target average bit rate is determined within that interval. To be concrete, in addition to creating regularly partitioned time intervals, partitioning takes place also in the boundary between important interval and non-important interval. In the process performed in the time interval 711, the amount of change per unit time is obtained from the change in the amount of data carried by carousels within the interval 711. Then, the intra-interval target average bit rate 721 for this particular time interval is obtained by subtracting the obtained amount of change per unit time from the target average bit rate (represented by the graph 512 in FIG. 5). If the intra-interval target average bit rate is given by $R_{target}$, the target bit rate $R''_{output}(t)$ is calculated in the same manner as in the first embodiment described above.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A bit rate converter for converting a first encoded animation image data to a second animation image data having a bit rate different from a bit rate of the first animation image data, the bit rate converter comprising:
    means for storing an assessment value indicating an importance level for each of one or more reproduction time intervals with respect to the first animation image data, wherein the second animation image data are generated by arithmetically determining the bit rate of the second animation image data on the basis of the bit rate information of the first animation image data and the assessment value indicating the importance level within a preselected reproduction time interval with respect to the first animation image data, and a larger amount of code is preferentially allocated to the preselected reproduction time interval having a higher assessment value which correspond to a higher importance level,
    wherein the bit rate converter receives, from a receiver which is a transmitting destination of the second animation image data, information on a total capacity of the reception buffer, an extent of the reception buffer being used, and the bit rate as a measure of reception speed, in determining the bit rate of the second animation image data, and which determines within each of the reproduction time intervals the bit rate of the second animation image data so that the extent of the reception buffer being used may not cause any of an overflow or an underflow for the total capacity of the reception buffer during data reception, and
    wherein when the first animation image data includes additional data irrelevant to the encoding of an animation image, all or part of the additional data are shifted in order from the reproduction time intervals having assessment values indicating higher importance levels to the reproduction time intervals having assessment values indicating lower importance levels, with respect to the first animation image data, and wherein the bit rate of the second animation image data is determined for each of the reproduction time intervals in such a manner that the increase or decrease in the bit amount as a result of the distribution of the additional data into the respective reproduction time intervals can be offset.

2. A bit rate converter as claimed in claim 1, wherein the assessment value indicating the importance level is an assessment value that indicates the importance level for a preselected reproduction time interval in the first animation image data, and wherein assessment value interpolation is performed during the reproduction time intervals where there are no assessment values indicating importance level.

3. A bit rate conversion method for converting a first encoded animation image data to a second animation image data having a bit rate different from a bit rate of the first animation image data, comprising:
    a step of storing an assessment value indicating an importance level for each of one or more reproduction time intervals with respect to the first animation image data;
    a step of generating the second animation image data by arithmetically determining the bit rate of the second animation image data on the basis of the bit rate information of the first animation image data, the assessment value indicating the importance level within a preselected reproduction time interval with respect to the first animation image data, and a target average bit rate, and an amount of code becomes larger for higher assessment values which correspond to higher importance levels;
    a step of receiving, from a receiver that is a transmitting destination of the second animation image data, information on a total capacity of the reception buffer, an extent of a reception buffer being used, and the bit rate as a measure of reception speed, in determining the bit rate of the second animation image data; and
    a step of determining within each of the reproduction time intervals the bit rate of the second animation image data so that the extent of the reception buffer being used may not cause any of an overflow or an underflow for the total capacity of the reception buffer during data reception,
    wherein when the first animation image data includes additional data irrelevant to the encoding of an animation image, all or part of the additional data are shifted in order from the reproduction time intervals having assessment values indicating higher importance levels to the reproduction time intervals having assessment values indicating lower importance levels, with respect to the first animation image data, and wherein the bit rate of the second animation image data is determined for each of the reproduction time intervals in such a manner that the increase or decrease in the bit amount as a result of the distribution of the additional data into the respective reproduction time intervals can be offset.

* * * * *